US009968504B2

(12) United States Patent
Johns

(10) Patent No.: US 9,968,504 B2
(45) Date of Patent: May 15, 2018

(54) METHOD OF FABRICATING AN ORNAMENTAL URN

(71) Applicant: Brandon C. Johns, Great Falls, MT (US)

(72) Inventor: Brandon C. Johns, Great Falls, MT (US)

( * ) Notice: Subject to any disclaimer, the term of this patent is extended or adjusted under 35 U.S.C. 154(b) by 1093 days.

(21) Appl. No.: 14/186,412

(22) Filed: Feb. 21, 2014

(65) Prior Publication Data
US 2014/0239538 A1 Aug. 28, 2014

Related U.S. Application Data

(60) Provisional application No. 61/767,823, filed on Feb. 22, 2013.

(51) Int. Cl.
| A61G 17/08 | (2006.01) |
| B29C 41/02 | (2006.01) |
| B29C 41/04 | (2006.01) |
| A61G 17/007 | (2006.01) |

(52) U.S. Cl.
CPC .......... *A61G 17/08* (2013.01); *B29C 41/02* (2013.01); *A61G 17/007* (2013.01); *B29C 41/04* (2013.01)

(58) Field of Classification Search
CPC ..................................... B29C 41/02
See application file for complete search history.

(56) References Cited

U.S. PATENT DOCUMENTS

| 2,562,726 | A | * | 7/1951 | MacDonald | E04H 13/006 |
| | | | | | 215/12.1 |
| 3,886,252 | A | * | 5/1975 | Eker | C11O 5/02 |
| | | | | | 264/132 |
| 5,543,100 | A | * | 8/1996 | Kluh | B29C 33/40 |
| | | | | | 264/130 |
| 5,692,277 | A | * | 12/1997 | Chen | A61G 17/08 |
| | | | | | 27/17 |
| D418,271 | S | | 12/1999 | Parker | |
| D613,809 | S | | 4/2010 | Barnes | |
| D640,444 | S | | 6/2011 | Roberson | |
| D650,961 | S | | 12/2011 | Roberson | |
| D650,962 | S | | 12/2011 | Roberson | |
| 8,074,329 | B2 | | 12/2011 | Roberts | |
| 2003/0004740 | A1 | * | 1/2003 | Dickey | G06Q 30/06 |
| | | | | | 705/26.1 |
| 2006/0118448 | A1 | * | 6/2006 | Fanning | G09F 19/08 |
| | | | | | 206/457 |

* cited by examiner

*Primary Examiner* — Matthew Daniels
*Assistant Examiner* — Kimberly A Stewart
(74) *Attorney, Agent, or Firm* — Neustel Law Offices

(57) ABSTRACT

A method which allows creation of an ornamental urn from an object such as horns, antlers, rocks, or the like. The method generally includes steps which form an ornamental urn adapted to resemble an object. The ornamental urn may include an access port having a funnel portion leading to an inner cavity adapted to store particulate materials, such as cremated remains. A plug, which may include a burr edge, is also provided to close the access port. The urn is fabricated by coating the object in a first coating to create an object mold, forming a second coating around the object mold to create an outer casing, and uniformly distributing a casting material along the inner walls of the object mold. After the casting material has cured, the ornamental urn may be removed from the object mold and finished to closely resemble the original object.

14 Claims, 17 Drawing Sheets

METHOD OF FABRICATING AN ORNAMENTAL URN

CROSS REFERENCE TO RELATED APPLICATIONS

I hereby claim benefit under Title 35, United States Code, Section 119(e) of U.S. provisional patent application Ser. No. 61/767,823 filed Feb. 22, 2013. The 61/767,823 application is currently pending. The 61/767,823 application is hereby incorporated by reference into this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to an ornamental urn and more specifically it relates to a method of fabricating an ornamental urn which allows creation of an ornamental urn from an object such as horns, antlers, rocks or the like.

Description of the Related Art

Any discussion of the related art throughout the specification should in no way be considered as an admission that such related art is widely known or forms part of common general knowledge in the field.

Cremation has become an increasingly popular alternative to burial in a conventional coffin or casket. With the increase in popularity of cremation, an industry has developed around fabrication and sales of urns for use in storing the cremated remains of a loved one.

Typical prior art urns are comprised of ornamental vases or other containers which may have a wide range of appearances and be fabricated using a wide range of methods. A more common urn is one which is formed of a metal such as brass, silver, or gold to appear as an ornate container.

Those who have a love of nature may desire that an urn be utilized which reflects that passion. For example, the loved ones of a hunter may wish to store his/her remains in an urn which resembles a portion of game hunted by that person. An object such as antlers, rocks, or horns from game previously hunted by the deceased would provide a unique urn which is representative of the deceased individual's interests.

Because of the inherent problems with the related art, there is a need for a new and improved method of fabricating an ornamental urn which allows creation of an ornamental urn from an object such as horns, antlers, horns, or the like.

BRIEF SUMMARY OF THE INVENTION

The invention generally relates to a method of fabricating an ornamental urn from an object which includes steps which form an ornamental urn adapted to resemble an object. The ornamental urn may include an access port having a funnel portion leading to an inner cavity adapted to store particulate materials, such as cremated remains. A plug, which may include a burr edge, is also provided to close the access port. The urn is fabricated by coating the object in a first coating to create an object mold, forming a second coating around the object mold to create an outer casing, and uniformly distributing a casting material along the inner walls of the object mold. After the casting material has cured, the ornamental urn may be removed from the object mold and finished, such as by adding the funnel portion and plug along with any painting or other finishing to closely resemble the original object.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
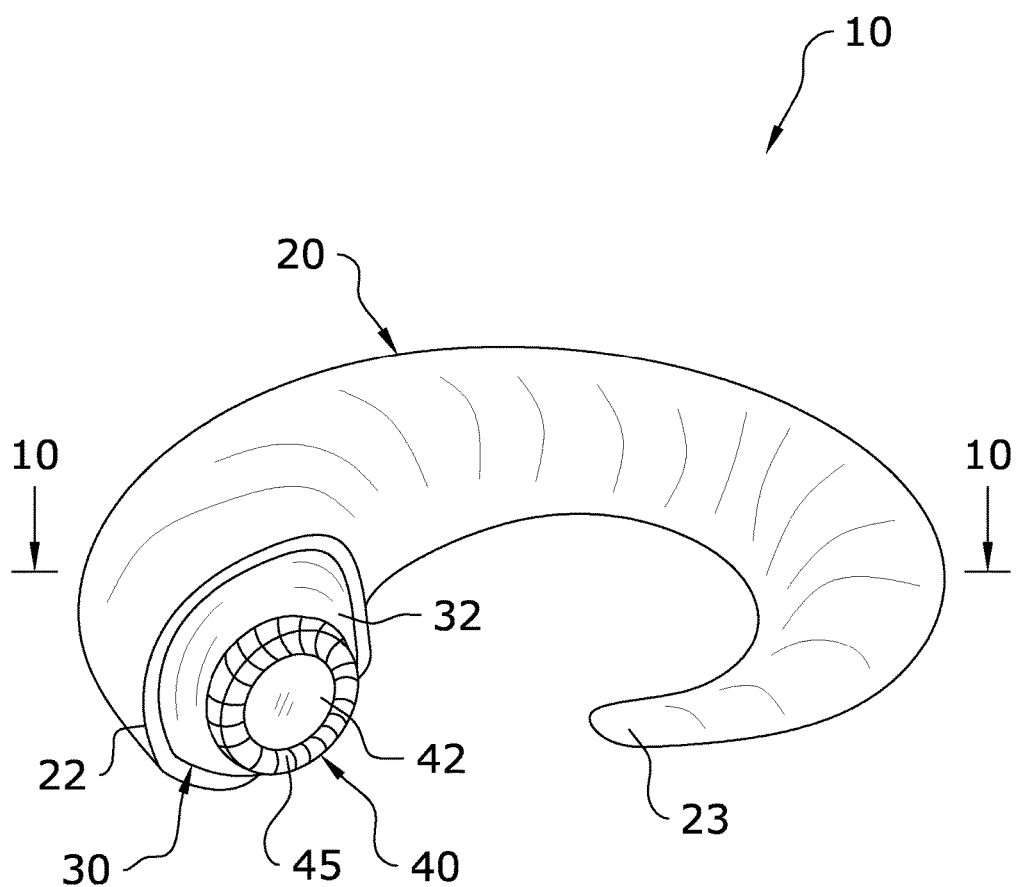
FIG. 1 is an upper perspective view of the present invention.
Figure 2:
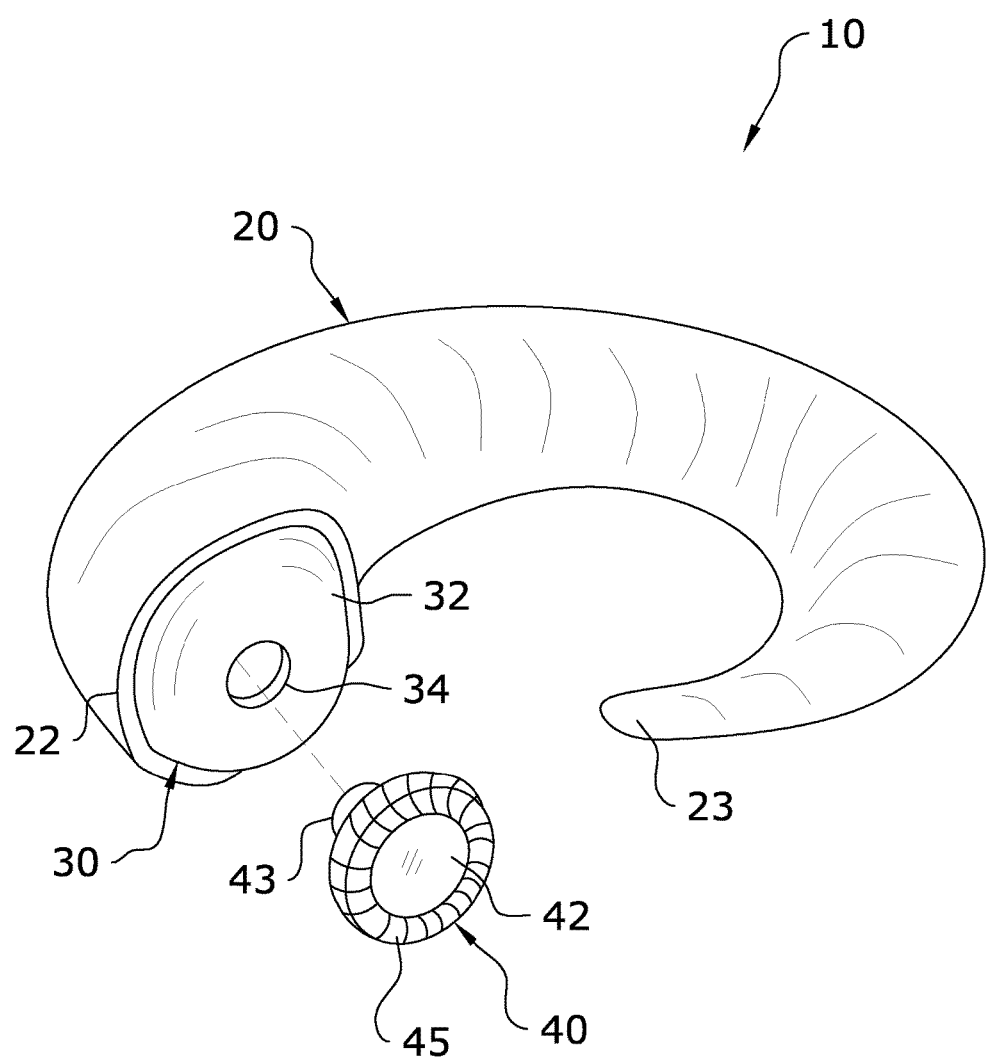
FIG. 2 is an upper perspective view of the present invention with the plug removed.

A. Ornamental Urn.

Turning now descriptively to the drawings, in which similar reference characters denote similar elements throughout the several views, FIGS. 1 through 17 illustrate a method of fabricating an ornamental urn 10 and the resulting ornamental urn 20. The figures illustrate an ornamental urn 20 and method for fabrication thereof which utilizes an object 12 comprised of a curved horn for fabrication of the ornamental urn 20. It should be appreciated that these figures are merely illustrative and, in some embodiments, the object 12 may be comprised of objects other than horns, such as antlers or a rock.

FIGS. 1, 2, 9, and 10 illustrate an ornamental urn 20 fabricated using the methods claimed herein. In the embodiment shown in the figures, the ornamental urn 20 comprises a curved horn design having a first end 22 and a second end 23. An opening 25 at the first end 22 of the ornamental urn 20 provides access to an inner cavity 26. The opening 25 may include an access port 30 which will preferably include a funnel portion 32 to aid in inserting and removing particulate material 14 such as cremated remains into and out from the cavity 26. A plug 40 may also be provided to close the access port 30 when needed. In some cases, the plug 40 may include a burr edge 45 to match the appearance of the ornamental urn 20 and improve aesthetic value.

B. Method of Fabrication.

To fabricate the ornamental urn 20, an object 12 is first provided which will be the basis for the appearance of the ornamental urn 20. As noted, the object 12 may be comprised of a wide range of objects which would benefit from being the basis for the appearance of the urn 20, such as horns, antlers, a rock, or the like.

Figure 3:
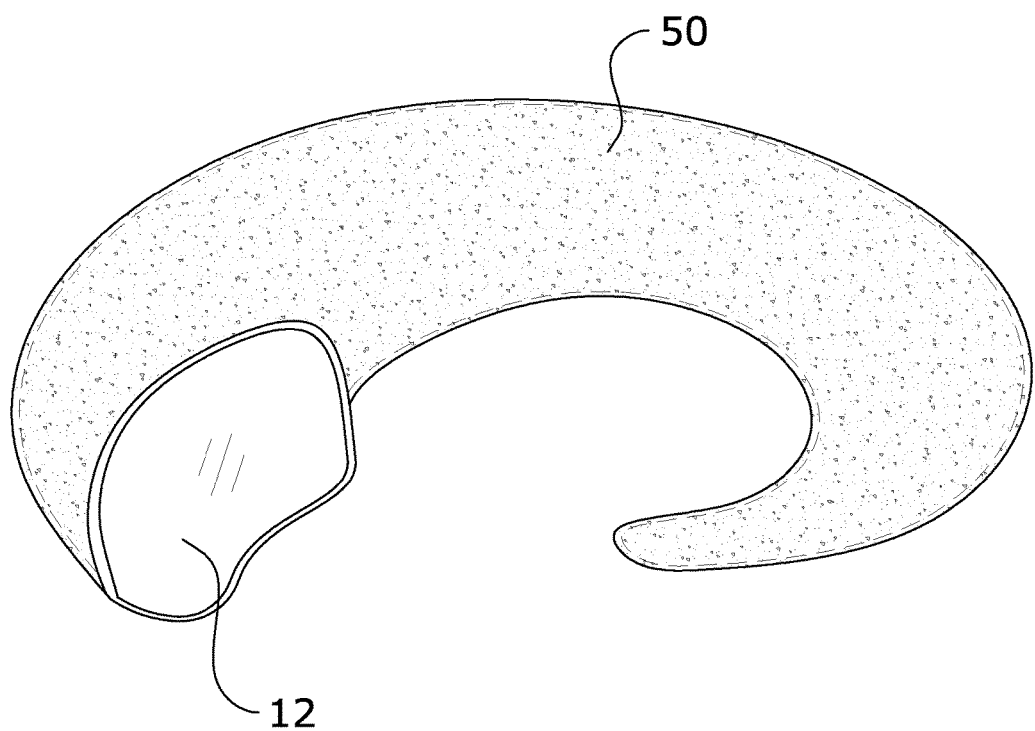
FIG. 3 is an upper perspective view of an object coated with the first coating.
Figure 12:
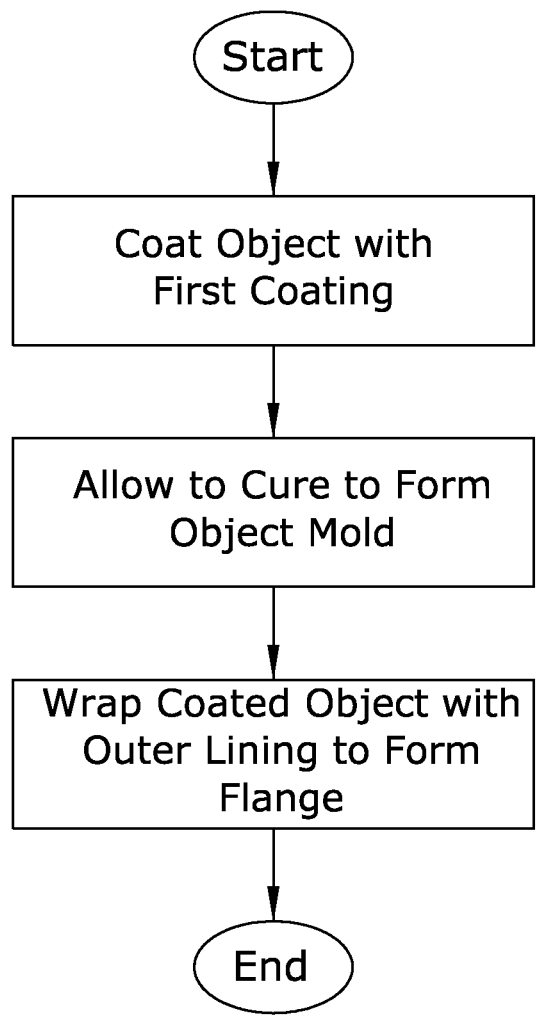
FIG. 12 is a flowchart illustrating first coating steps of the present invention.

As shown in FIG. 3 and illustrated in FIG. 12, the object 12 is first coated with a first coating 50. The first coating 50 is generally comprised of a curing compound or material which will cure into a flexible or resilient object mold 52 which is utilized to create the ornamental urn 20. Various types of first coatings 50 may be utilized. In a preferred embodiment, the first coating 50 will be comprised of a rubber molding substance.

Figure 4:
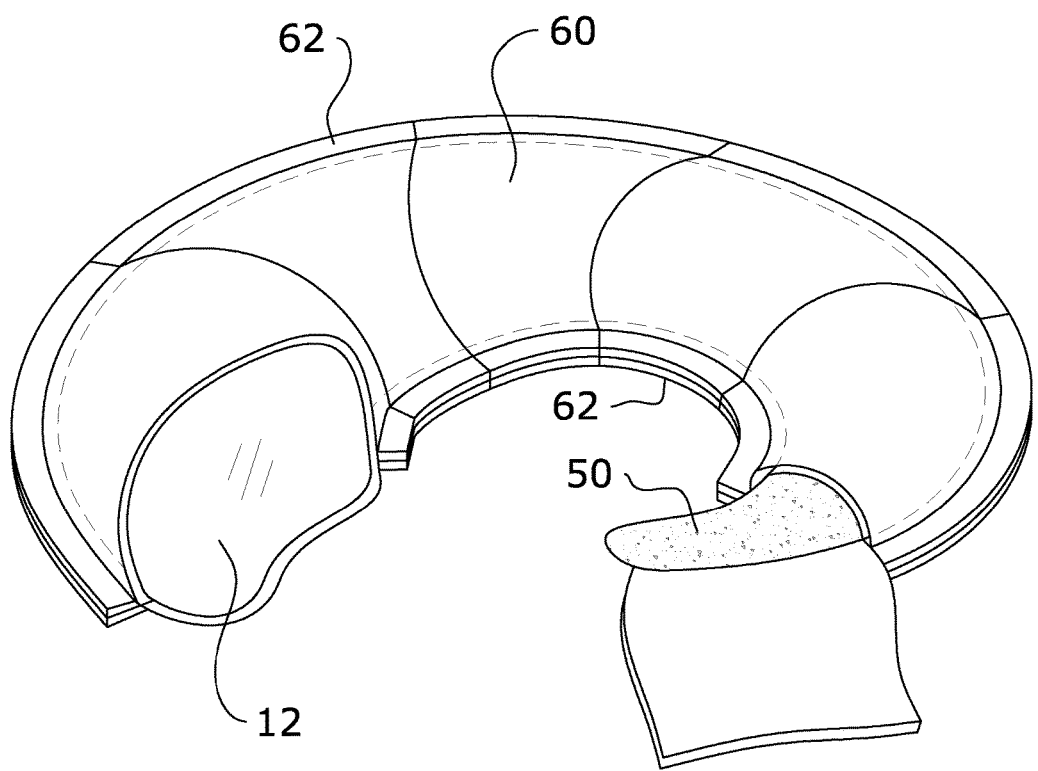
FIG. 4 is an upper perspective view illustrating application of the outer lining to the coated object.

After coating the object 12 with the first coating 50, an outer lining 60 is formed around the object 12 and first coating 50 as best shown in FIG. 4. The outer lining 60 is utilized to form a flange 62 around the object 12 and first coating 50 over which the outer casing 72 will be formed.

The flange 62 allows the upper and lower portions 74, 75 of the outer casing 72 to be separated as required by further steps in the fabrication process and described below. Various types of outer lining 60 may be utilized so long as the outer lining 60 allows for easy removal of the outer casing 72 after the second coating 70 has cured. In a preferred embodiment, the outer lining 60 may be comprised of foil or a similar lining.

Figure 5:
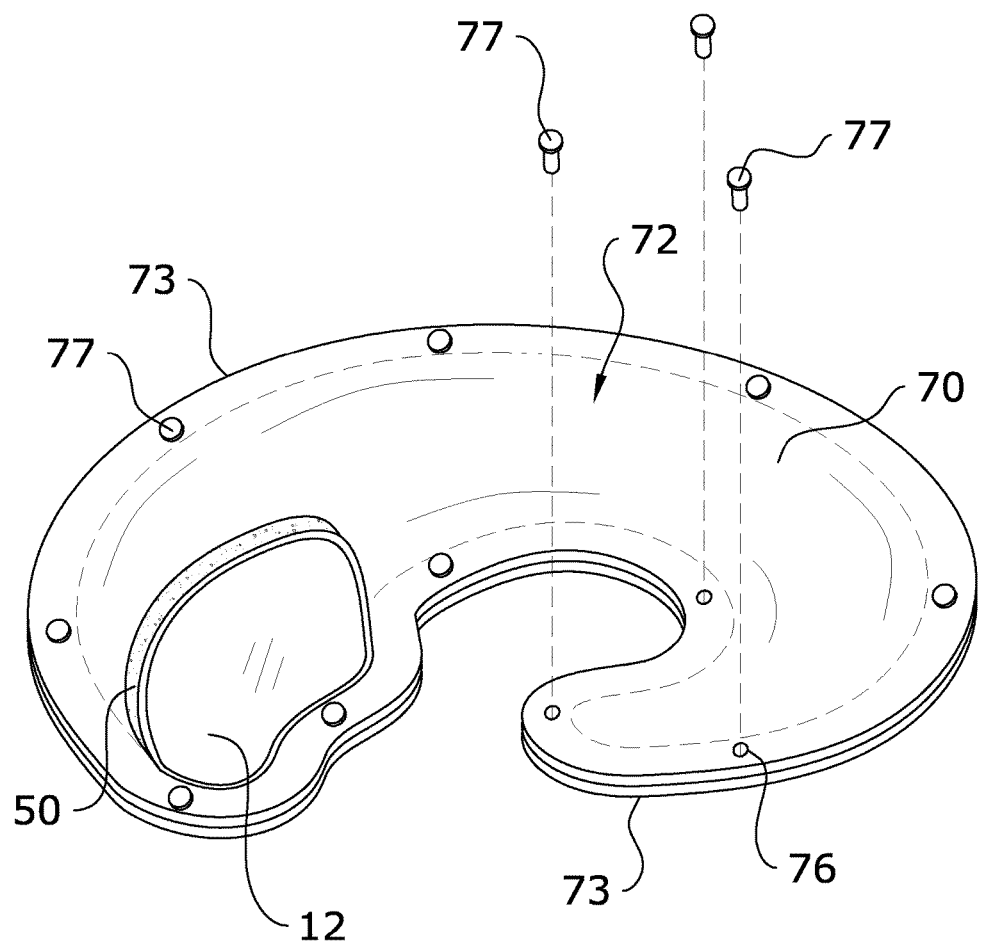
FIG. 5 is an upper perspective view illustrating the second coating being applied.
Figure 13:
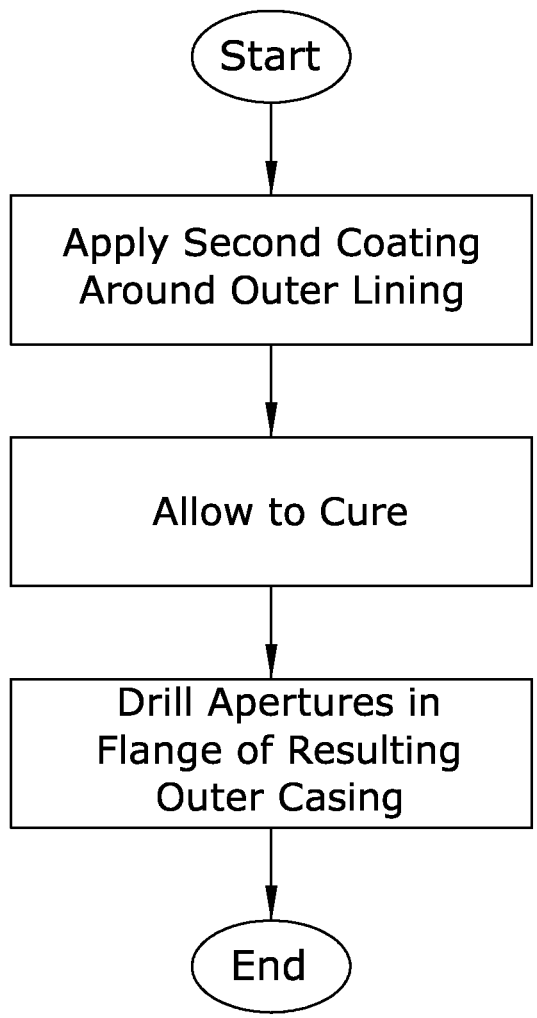
FIG. 13 is a flowchart illustrating formation of the outer casing of the present invention.

After lining the object 12 and first coating 50 with the outer lining 60, a second coating 70 is applied around the outer lining 60 and allowed to cure as shown in FIG. 5 and illustrated in FIG. 13. The second coating 70 will cure to form an outer casing 72 which will be positioned around the object mold 52 when the ornamental urn 20 is being fabricated.

Because the object mold 52 created from the first coating 50 is flexible or resilient, a solid outer lining 60 is needed to protect the structural integrity of the object mold 52 and prevent divots or other irregularities from forming during curing of the curing material 80 described below. Thus, the second coating 70 is preferably comprised of a material which will cure into a hard, rigid material, such as plaster, fiber glass coatings, or the like.

Figure 6:
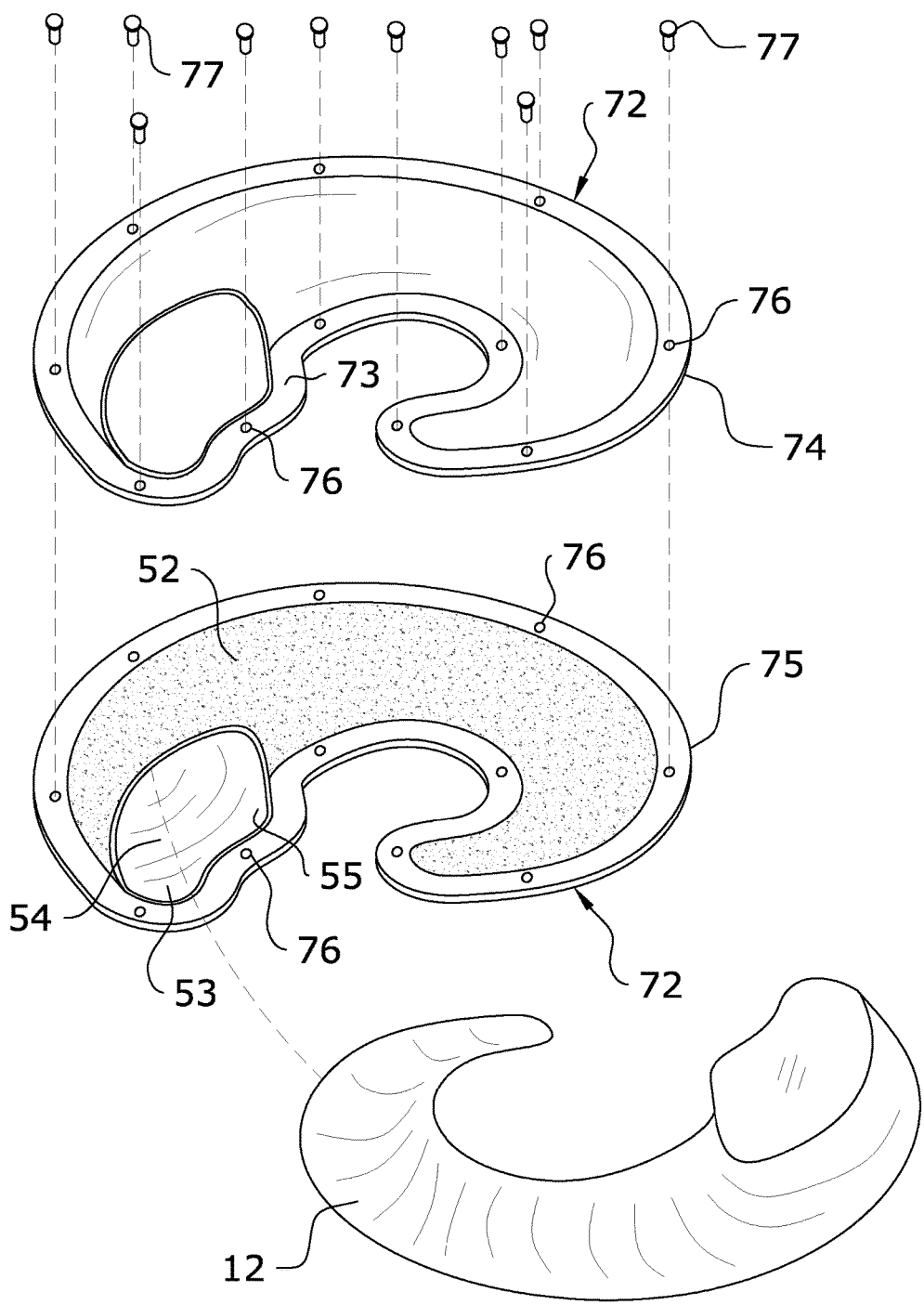
FIG. 6 is an upper perspective view illustrating the object being removed from the outer casing and object mold.

After curing, the second coating 70 will form a rigid outer casing 72 comprised of an upper portion 74 and a lower portion 75 as best shown in FIG. 6. The central portion of the outer casing 72 will resemble the outer contours of the object mold 52 and be surrounded by a flange 73 which was formed due to positioning of the outer lining 60 around the object mold 52.

Both the upper and lower portions 74, 75 will have flanges 73 through which apertures 76 may be drilled or otherwise formed. Fasteners 77 may be extended through the apertures 76 to removably secure the upper portion 74 to the lower portion 75 to form the outer casing 72 as shown in FIG. 5.

Figure 7:
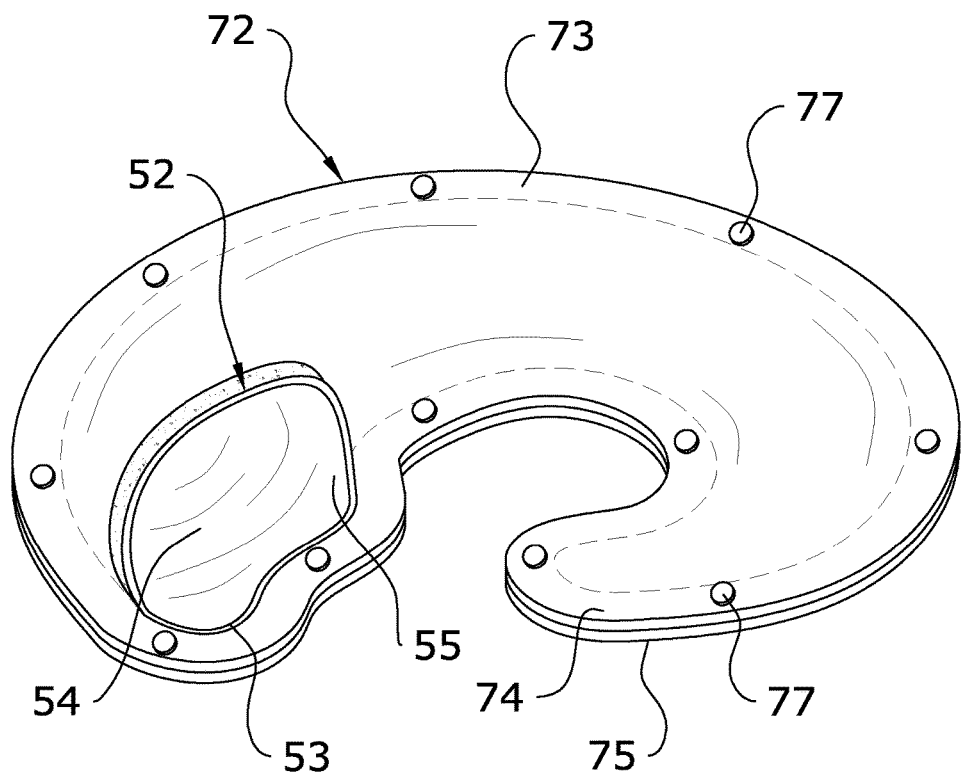
FIG. 7 is an upper perspective view of the outer casing and object mold assembled together.
Figure 14:
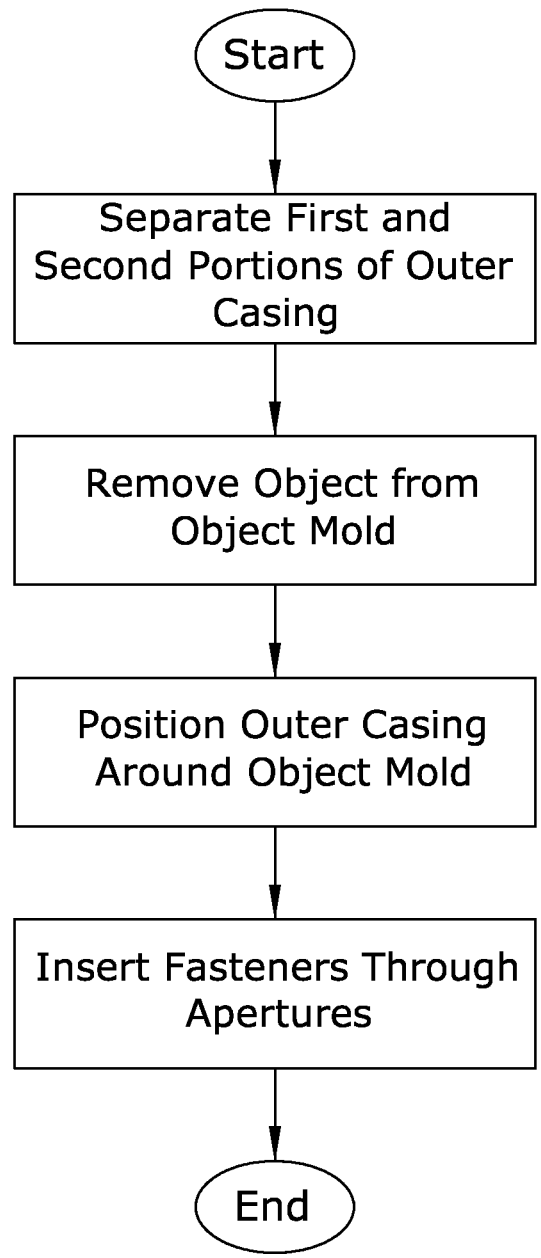
FIG. 14 is a flowchart illustrating removal of the object and reformation of the outer casing and object mold.

After formation of the outer casing 72, the upper and lower portions 74, 75 are separated and the object 12 removed from the object mold 52 as shown in FIGS. 6 and 14. The object 12 may then be disposed of or set aside. The upper and lower portions 74, 75 are secured back together such as by use of fasteners 77 around object mold 52 with the opening 53 of the object mold 52 exposed through the outer casing 72 as shown in FIG. 7.

Figure 8:
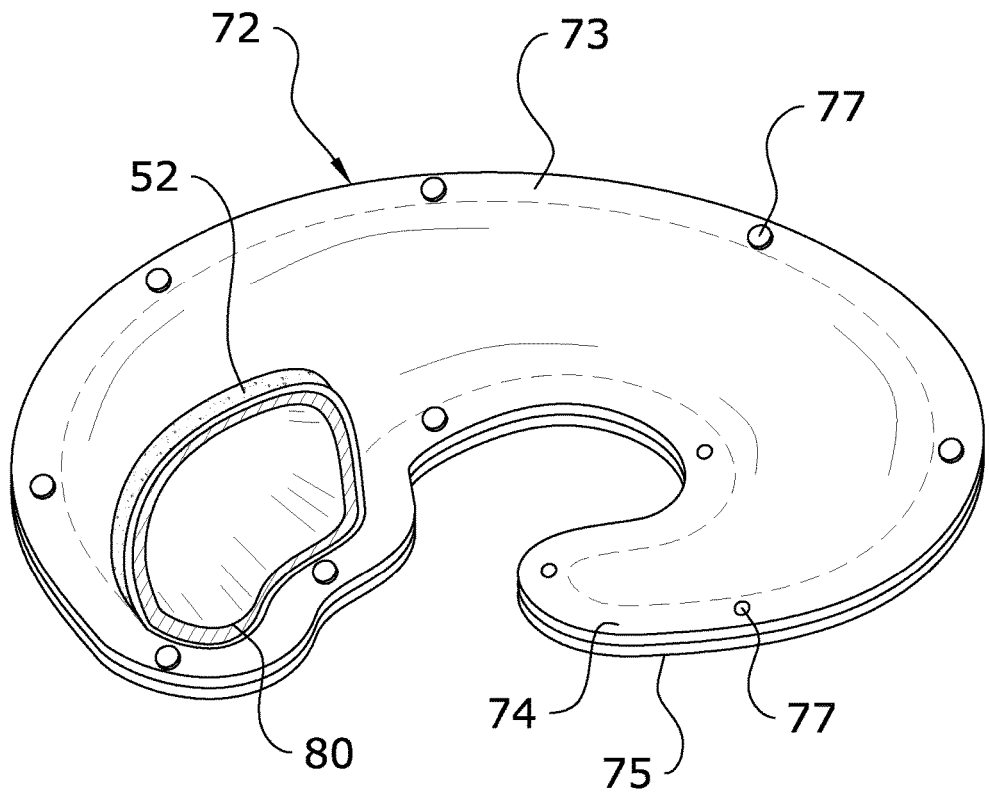
FIG. 8 is an upper perspective view illustrating insertion and lining of a casting material within the object mold.
Figure 15:
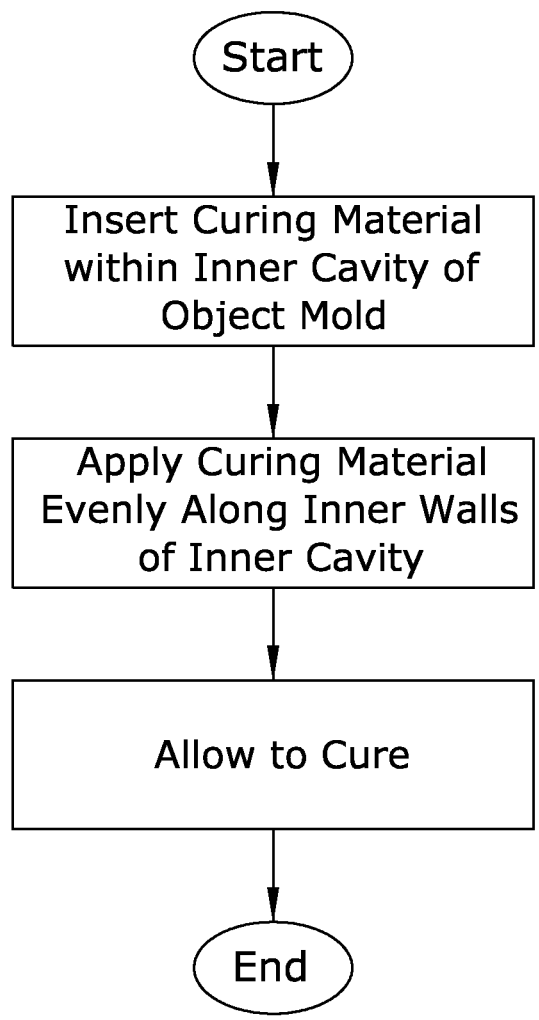
FIG. 15 is a flowchart illustrating insertion of curing material within the object mold.

The outer casing 72 and object mold 52 may now be used to form the ornamental urn 20. A curing material 80 is inserted through the opening 53 of the object mold 52 such that the curing material 80 lines the inner walls 55 of the inner cavity 54 as shown in FIGS. 8 and 15. The curing material 80 may be comprised of various materials known to cure into a rigid model of the object mold 52, such as plaster, resin, casting metals or the like.

Various methods may be utilized to apply the curing material 80 to the inner walls 55 of the object mold 52, such as by manually applying the curing material 80 to the inner walls 55 or by introducing the curing material 80 within the object mold 52 and then using centrifugal force, such as through use of a centrifuge, to uniformly line the inner walls 55 of the object mold 52 with the curing material 80.

The curing material 80 is allowed to cure within the object mold 52 until fully cured. The outer casing 72 may then be removed from around the object mold 52 and the ornamental urn 20 removed from the object mold 52. The ornamental urn 20 will have a shape and contour which closely matches the object 12, with an opening 25 leading to an inner cavity 26.

Figure 9:
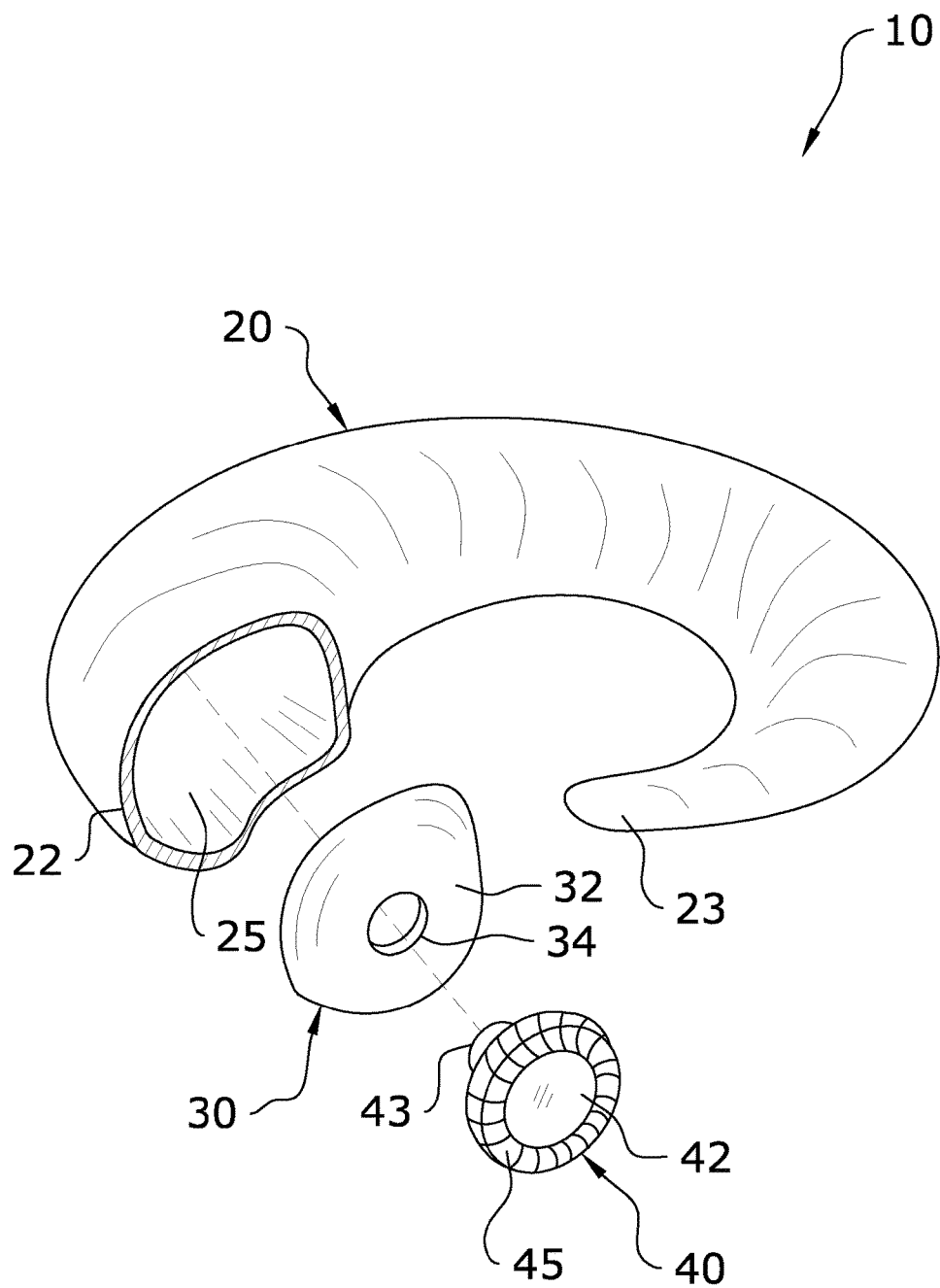
FIG. 9 is an upper perspective view illustrating addition of an access port and plug to the ornamental urn.
Figure 16:
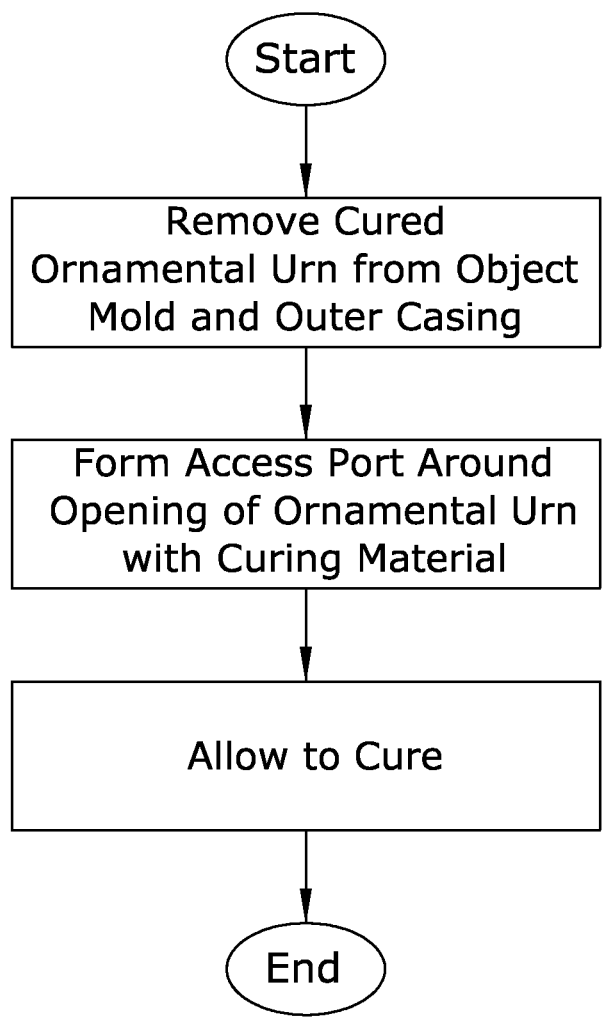
FIG. 16 is a flowchart illustrating formation of the access port.

As shown in FIGS. 9 and 16, the access port 30 will then be formed around the opening 25 of the ornamental urn 20. Curing material 80 such as that used to form the ornamental urn 20 will be applied around the opening 25 of the ornamental urn 20 to form the access port 30. A funnel portion 32 will first be formed with a central opening 34 which is concentric with the opening 25 of the ornamental urn 20 and provides access to its inner cavity 26. The ornamental urn 20 itself may also be painted, sculpted, sanded, or otherwise finished to closely resemble the object 12.

Figure 10:
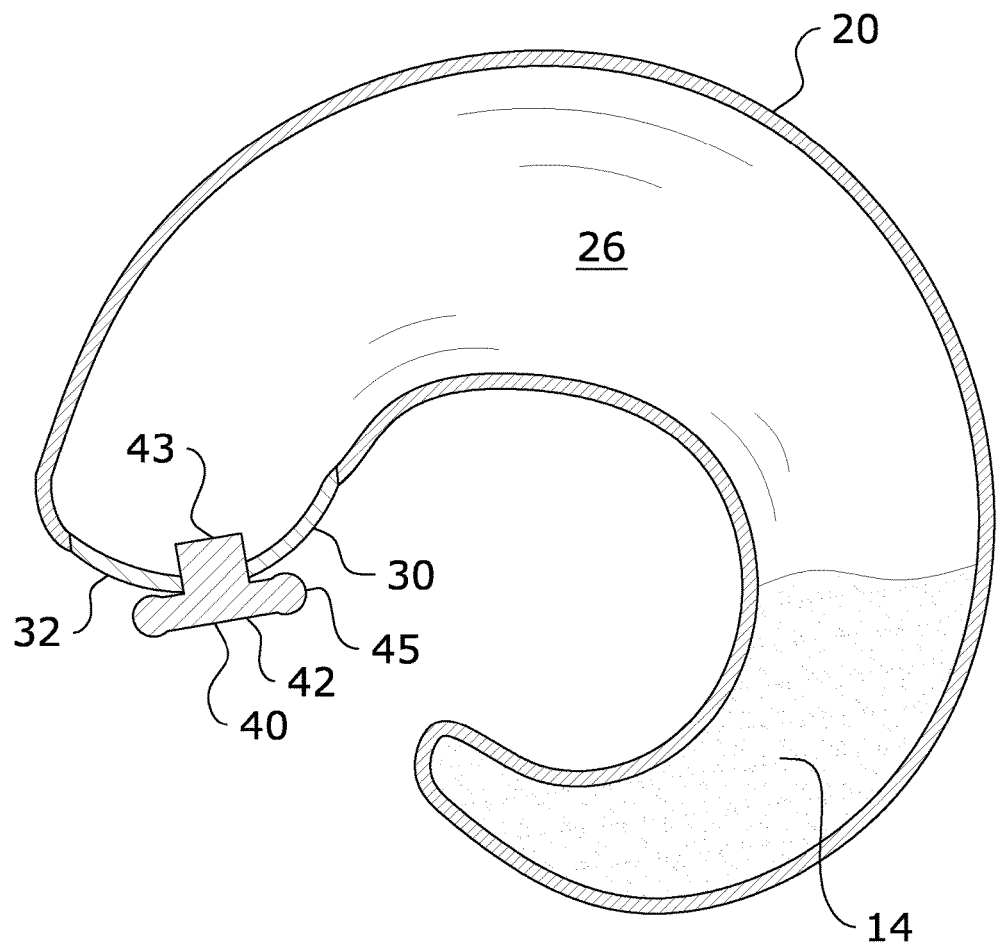
FIG. 10 is a side sectional view taken along line 10-10 of FIG. 1.
Figure 11A:
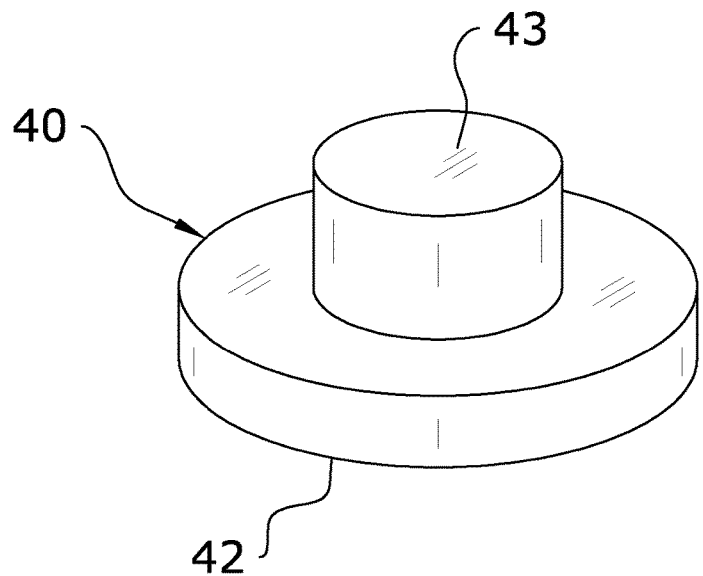
FIG. 11a is an upper perspective view of a plug for use with the present invention.
Figure 11B:
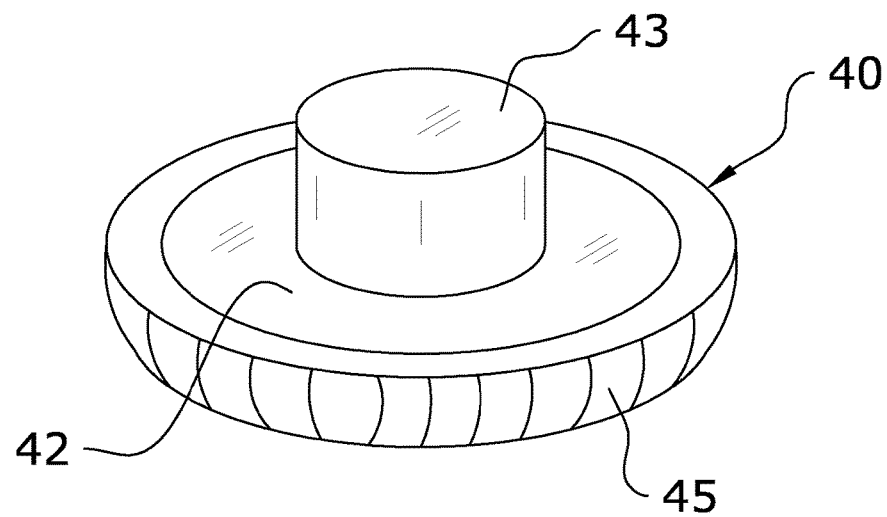
FIG. 11b is an upper perspective view of a plug with burr edges for use with the present invention.
Figure 17:
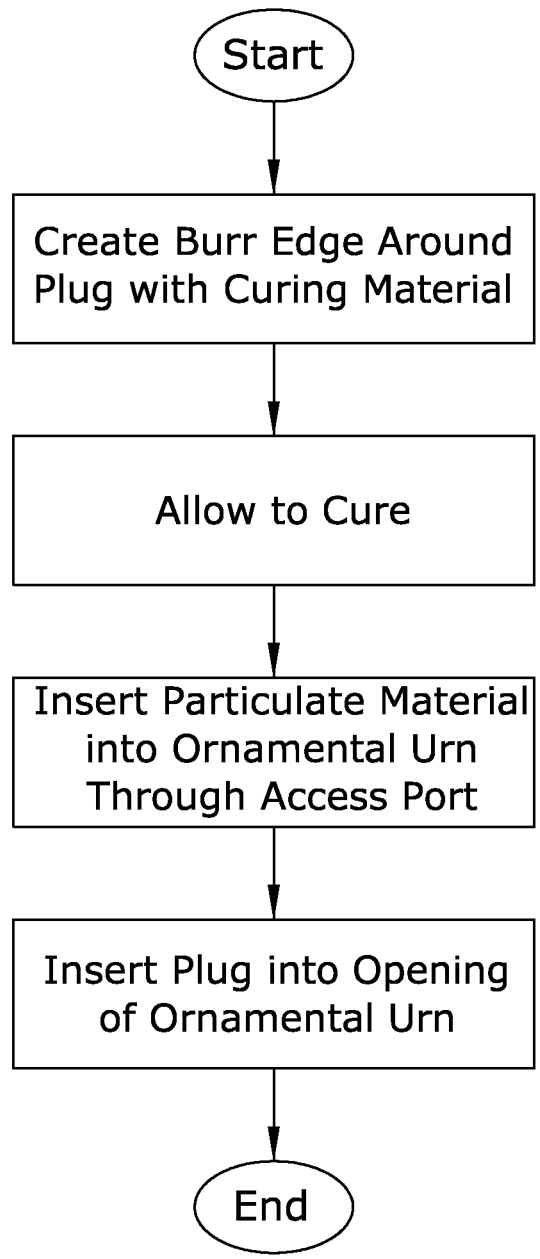
FIG. 17 is a flowchart illustrating the final steps of the present invention.

After the access port 30 is cured, particulate material 14 such as cremated remains may be inserted through the access port 30 into the ornamental urn 20 and a plug 40 inserted into the central opening 34 of the access port 30 to close off the inner cavity 26 as shown in FIGS. 10 and 17.

Various types of plugs 40 may be utilized. In a preferred embodiment, a plug 40 having a base portion 42 and a sealing projection 43 extending from the base portion 42 will be utilized. Curing material 80 may be utilized to form a burr edge 45 around the base portion 42 as shown in FIGS.

11a and 11b to match the appearance of the plug 40 more uniformly with the ornamental urn 20 and access port 30.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method of fabricating an urn for storing a particulate material, comprising:
    providing an object;
    coating said object with a first coating;
    allowing said first coating to cure to form an object mold;
    forming an outer lining around said object mold;
    forming a flange around said object mold with said outer lining;
    coating said outer lining with a second coating;
    allowing said second coating to cure to form an outer casing;
    removing said object from said object mold;
    inserting a curing material within said object mold;
    applying said curing material uniformly to line an inner wall of said object mold;
    allowing said curing material to cure into an urn resembling said object;
    removing said urn from said object mold, and
    inserting a particulate material comprised of cremated remains within the urn.

2. The method of fabricating an urn for storing a particulate material of claim 1, wherein said object is comprised of a horn.

3. The method of fabricating an urn for storing a particulate material of claim 1, wherein said object is comprised of antlers.

4. The method of fabricating an urn for storing a particulate material of claim 1, wherein said object is comprised of a rock.

5. The method of fabricating an urn for storing a particulate material of claim 1, wherein said first coating is comprised of rubber.

6. The method of fabricating an urn for storing a particulate material of claim 1, wherein said second coating is comprised of a plaster material.

7. The method of fabricating an urn for storing a particulate material of claim 1, wherein said step of applying said curing material is comprised of applying centrifugal force to said object mold.

8. The method of fabricating an urn for storing a particulate material of claim 1, further comprising the step of forming an access port around an opening of said urn.

9. The method of fabricating an urn for storing a particulate material of claim 8, wherein said access port includes a funnel portion and a central opening.

10. The method of fabricating an urn for storing a particulate material of claim 9, wherein said access port is formed of said curing material.

11. The method of fabricating an urn for storing a particulate material of claim 10, wherein said curing material is comprised of plaster.

12. The method of fabricating an urn for storing a particulate material of claim 1, further comprising the step of providing a plug to close an opening of said urn.

13. The method of fabricating an urn for storing a particulate material of claim 12, further comprising the step of forming a burr edge around said plug with said curing material.

14. The method of fabricating an urn for storing a particulate material of claim 1, further comprising the step of closing an opening of said urn with a plug.

* * * * *